United States Patent
Galasso

(10) Patent No.: US 7,821,623 B2
(45) Date of Patent: Oct. 26, 2010

(54) SURVEILLANCE SATELLITE IMAGE DENIAL SYSTEM

(75) Inventor: Douglas Anthony Galasso, Trabuco Canyon, CA (US)

(73) Assignee: The Boeing Company, Chicago, IL (US)

( * ) Notice: Subject to any disclaimer, the term of this patent is extended or adjusted under 35 U.S.C. 154(b) by 1425 days.

(21) Appl. No.: 10/990,202

(22) Filed: Nov. 16, 2004

(65) Prior Publication Data

US 2009/0322585 A1 Dec. 31, 2009

(51) Int. Cl.
*G01B 11/26* (2006.01)
(52) U.S. Cl. .............. 356/139.01; 356/139.02; 356/139.03; 342/13; 342/14; 342/16
(58) Field of Classification Search ....... 356/3.01–3.15, 356/4.01–4.1, 5.01–5.15, 139.01–139.1
See application file for complete search history.

(56) References Cited

U.S. PATENT DOCUMENTS

| | | | | |
|---|---|---|---|---|
| 6,480,140 B1 * | 11/2002 | Rosefsky | ................ | 342/14 |
| 6,707,052 B1 * | 3/2004 | Wild et al. | ............ | 250/504 R |
| 7,035,308 B1 * | 4/2006 | McNeil et al. | ............ | 372/109 |
| 2003/0083794 A1 * | 5/2003 | Halm et al. | .............. | 701/29 |
| 2003/0156046 A1 * | 8/2003 | Dwyer et al. | ............ | 340/973 |
| 2006/0000988 A1 * | 1/2006 | Stuart et al. | ........... | 250/504 R |

OTHER PUBLICATIONS

William J. McCarthy, Captian, USN Directed energy and Fleet Defense Implications for Naval Warfare, May 2000, Occasional Paper No. 10 Center for Strategy and Technology Air War College, pp. i-58.*

* cited by examiner

*Primary Examiner*—Thomas H Tarcza
*Assistant Examiner*—Luke D Ratcliffe
(74) *Attorney, Agent, or Firm*—Haynes & Boone, LLP

(57) ABSTRACT

A satellite surveillance countermeasure system uses an airborne platform to position a coherent radiation source above a substantial portion of the Earth's atmosphere. The coherent radiation source provides coherent radiation that is directed toward an enemy surveillance satellite, so as to reversibly deny the satellite the ability to image. By positioning the coherent radiation source at such an altitude, atmospheric attenuation and distortion are mitigated. Thus, a smaller, less powerful and less costly coherent radiation source can be utilized. The use of an airborne platform also makes the system more portable and affordable.

13 Claims, 3 Drawing Sheets

SURVEILLANCE SATELLITE IMAGE DENIAL SYSTEM

TECHNICAL FIELD

The present invention relates generally to electro-optical countermeasures and, more particularly, to a system for denying imaging capability to a surveillance satellite.

BACKGROUND

Surveillance satellites are well known. Surveillance satellites are commonly used to provide tactical advantages to maneuver commanders in the battlefield. For example, surveillance satellites can provide images that show terrain, troop disbursements, convoys, and the location of artillery, missiles, aircraft and other equipment.

Electro-optical countermeasures for denying imaging capability to surveillance satellites are also known. Such countermeasures typically comprise directing a laser beam from a ground-based countermeasure system toward a surveillance satellite, so as to saturate the imaging detector(s) thereof and thus inhibit imaging.

Since the laser sources of such contemporary countermeasure systems are disposed at approximately sea level, the laser beam must pass through substantially the entire thickness of the Earth's atmosphere to reach the target satellite. As those skilled in the art will appreciate, the Earth's atmosphere attenuates and distorts a laser beam that passes therethrough. Such attenuation and distortion substantially inhibits the ability of the laser beam to adequately effect the desired countermeasure.

Because of the detrimental effects of the Earth's atmosphere upon such electro-optical countermeasure laser beams, a more powerful laser source is required. Less powerful ground-based laser sources are simply less effective at denying imaging capability to surveillance satellites. Thus, such ground-based laser sources must be larger, more complex, and more costly than desired.

The complexity of such larger laser sources inherently affects their reliability in an adverse manner. That is, such complex systems have more potential for failure, since there are comparatively more things that can go wrong. It is important to appreciate that the failure of a countermeasure system during a battle can cost lives.

Further, such ground based electro-optical countermeasure systems tend to be stationary. Because of the powerful laser sources required, the size of the equipment and the electrical power requirements thereof tend to make portability difficult. Portable electro-optical countermeasure systems must have portable power sources.

As a result, there is a need for an electro-optical countermeasure system that utilizes smaller, less complex, and less expensive laser sources that are effective in denying imaging capability to surveillance satellites. It is also desirable to provide a portable electro-optical countermeasure system, to assure that satellite surveillance countermeasures can be implemented at the location of battlefields worldwide.

SUMMARY

Systems and methods are disclosed herein to provide a surveillance satellite countermeasures system comprising an airborne platform and a coherent radiation source disposed onboard the airborne platform. For example, in accordance with an embodiment of the present invention, an unmanned aerial vehicle (UAV) has a laser source onboard. A laser beam can be directed from the UAV toward a surveillance satellite to deny imaging capability to the surveillance satellite.

More specifically, in accordance with one embodiment of the present invention, the airborne platform ascends to an altitude such that it is above most of the Earth's atmosphere, e.g., an altitude greater than 15,000 feet. Thus, atmospheric attenuation and distortion of the coherent radiation is substantially mitigated. In this manner, the use of a smaller, substantially less powerful, coherent radiation source is possible.

In accordance with another embodiment of the present invention, a method of determining that the coherent radiation is being effectively directed toward a target satellite is provided. That is, coherent radiation feedback from the surveillance satellite is used to determine when the countermeasure coherent radiation beam is on-axis with respect to the optics of the surveillance satellite's imaging system. The feedback can be used to modify a parameter of the coherent radiation, so as to enhance the effectiveness thereof. For example, the angle of incidence of the coherent radiation beam with respect to the surveillance satellite's imaging system can be modified by fine tuning the tracking and/or pointing commands of the coherent radiation source.

In accordance with another embodiment of the present invention, a battle damage assessment system and/or an active designation system are also onboard the airborne platform. Because of the reduced weight of the coherent radiation source, various such other systems can be carried by the airborne platform to provide additional tactical advantages in a battlefield.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
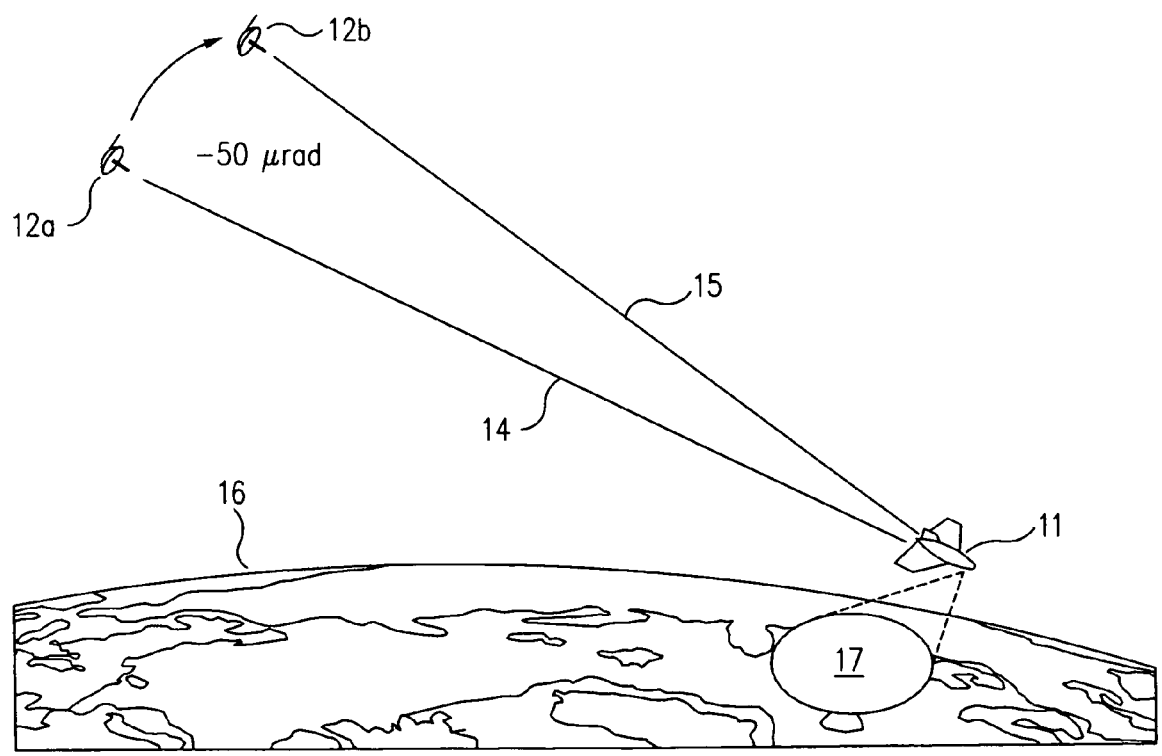
FIG. 1 is a diagram showing an airborne unmanned aerial vehicle (UAV) using a laser to deny imaging capability to a surveillance satellite in accordance with an exemplary embodiment of the present invention.

FIG. 1 shows a surveillance satellite 12 at one position where it is labeled as 12a and also shows the same surveillance satellite 12 later in time, after it has moved to another position, where it is labeled as 12b. The surveillance satellite is designated generally, without concern for its position, as 12. It is designated more specifically, when its position is worthy of note, as 12a or 12b. The positions themselves may also be referred to as 12*a* and 12*b* and the distinction between the satellite and its positions will be clear from the context.

An unmanned aerial vehicle (UAV) 11 is airborne above the Earth 16. As discussed in detail below, a source of radiation, that can be a source of coherent radiation such as a laser source, can be used to temporarily blind surveillance satellite 12. That is, a laser beam 15 can be directed toward surveillance satellite 12, so as to overfill the aperture of one or more imaging devices thereof and thus prevent the imaging system of surveillance satellite 12 from collecting data in a limited area in the line of sight along a line drawn from the satellite through UAV 11 and on to the Earth 16 below. In this manner, imaging capability of surveillance satellite 12*b* is reversibly denied.

Reversibly denying imaging capability to a surveillance satellite denies the imaging capability in a manner that is not permanent. That is, once laser beam 15 is turned off, the surveillance satellite 12 can readily resume imaging, without any substantial lasting detrimental effects.

A radiation source is coupled to an airborne platform and is configured to direct an energy beam at the satellite sufficient to at least disrupt at least one surveillance function of the satellite. Typically, the energy beam will disrupt an imaging function of the satellite. However, the energy beam may disrupt other functions of the satellite, such as the function of a star tracker.

Because of the great distances and speeds involved, laser beam 15 must be fired so as to lead surveillance satellite 12 according to well known principles. For example, laser beam 15 can be fired approximately 50 microradians ahead of satellite 12 at the time that satellite 12 is at position 12*a* and is moving toward position 12*b*. That is, laser beam 15 can be fired toward position 12*b* instead of along line 14 toward position 12*a*. By the time that laser beam 15 reaches position 12*b*, satellite 12 also reaches position 12*b*, so that laser beam 15 hits satellite 12.

UAV 11 is one example of an airborne platform that can be used to transport a radiation source, such as a coherent light source, to an altitude that is above most of the Earth's atmosphere (e.g., an altitude of 15,000 to 25,000). Thus, UAV 11 can reach altitudes where the output from the coherent light source only needs to travel though approximately 20% of the Earth's atmosphere to reach its target.

The airborne platform can alternatively be an aircraft (such as an airplane or a helicopter), a balloon, or any other vehicle that is capable of traveling to such an altitude. The airborne platform can be either manned or unmanned.

Optionally, UAV 11 may additionally have a battle damage assessment (BDA) system, such as a BDA system that provides imagery or other assessment of a battlefield 17 that is located on the Earth 16, generally beneath UAV 11. The BDA may be a three-dimensional BDA. As a further option, UAV 11 may have an active designation system that illuminates targets within battlefield 17, such as with a laser, so as to facilitate the use of smart (laser guided) bombs and missiles against such targets.

Figure 2:
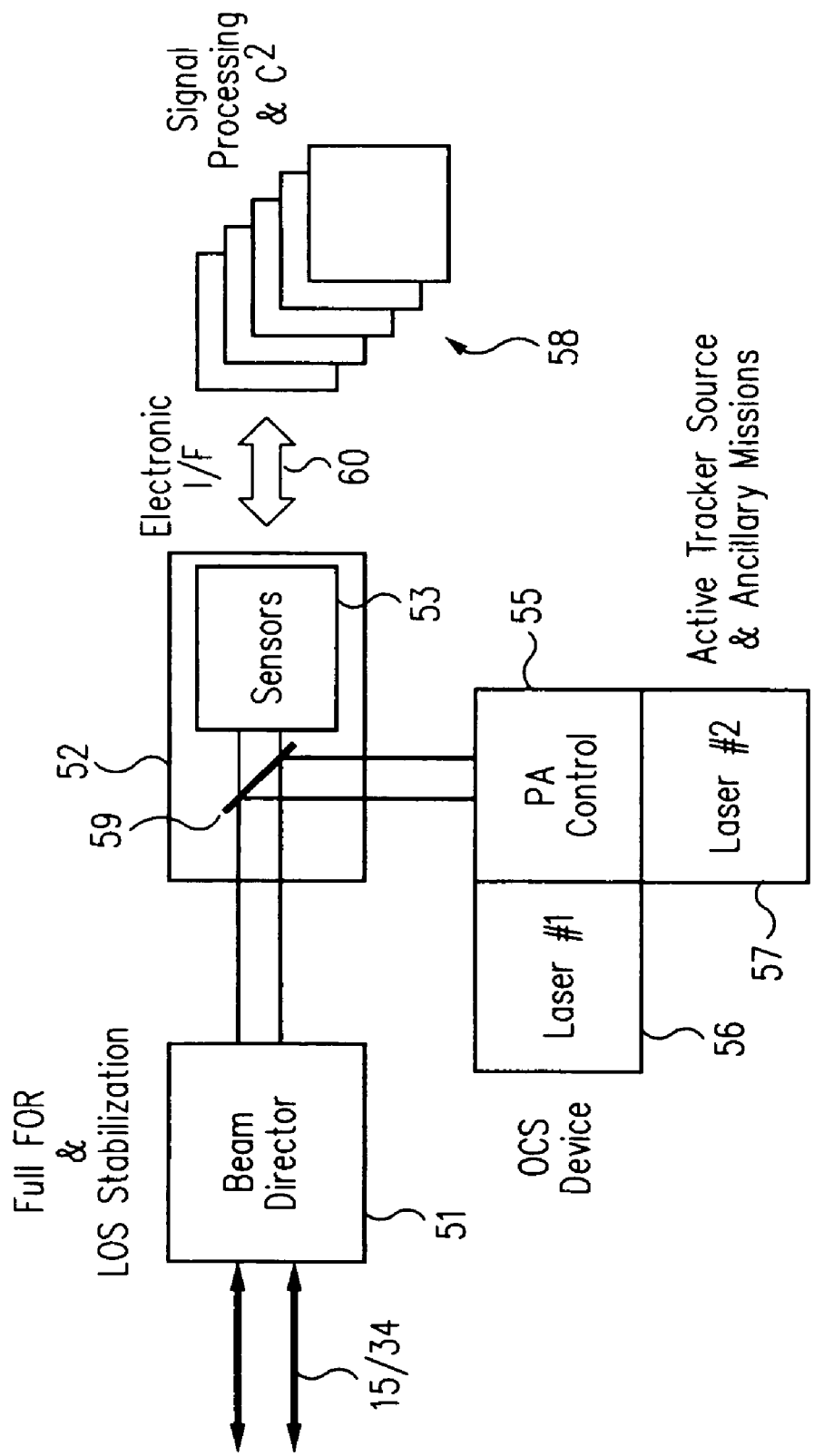
FIG. 2 shows a block diagram of the UAV-based surveillance satellite image denial system of FIG. 1.

FIG. 2 is an exemplary block diagram of an offensive countermeasure system (OCS) that is suitable for use in the UAV of FIG. 1. According to this embodiment, at least one laser provides an output to a point ahead control 55. For example, two lasers 56 and 57 can provide outputs to point ahead control 55. Point ahead control 55 effects leading of laser beam 14 according to well known principles. Two lasers 56 and 57, and point ahead control 55, cooperate to define an active tracer source. Alternatively, either a single laser or more than two lasers can be used. The two lasers 56 and 57 can both be used for image denial. Alternatively, one of the two lasers 56 and 57 can be used for image denial and the other can be used for ancillary missions, such as active target designation. Lasers 56 and 57 can have different frequencies.

Optionally, each laser 56 and 57 can have a dedicated beam director, so that each can function independently, such as for different missions (e.g., to simultaneously deny imaging to two different satellites or to facilitate simultaneous image denial and active target designation).

The output of point ahead control 55 is provided to a splitter/sensor assembly 52. Splitter/sensor assembly 52 comprises a beam splitter 59 that directs the outputs of lasers 56 and 57 to a beam director 51. Splitter/sensor assembly 53 also comprises a sensor assembly 53 which comprises one or more sensors, such as imaging sensors. At least one of the sensors of sensor assembly 53 facilitates optical augmentation for enhanced targeting, as described below.

The laser beam from beam splitter 59, is aimed by beam director 51, to provide output beam 15 that is directed toward position 12*b* of satellite 12, as discussed above. Beam director 51 can comprise a stable platform to enhance line of sight stabilization and/or field of regard, according to well known principles. Received reflected light 34 from at least one imager of satellite 12 can be directed by beam director 51 to splitter/sensor assembly 52, where it passes through splitter 59 and is incident upon sensor assembly 53.

An electronic interface 60 provides signals from sensor assembly 53 to a signal processing and $C^2$ (Command and Control) system 58. The signals are representative of the relative position of satellite 12 and the intensity of returned light 34. The signals can be used to facilitate optical augmentation.

UAV 11 can have an onboard targeting system comprising an acquisition system and a tracking system. The onboard targeting system can be defined by sensor assembly 53 and signal processing and $C^2$ system 58. Alternatively, the targeting system can be ground based or can be aboard another airborne or space-based platform.

The acquisition system acquires target surveillance satellite 12 according to well known principles. For example, target acquisition can be accomplished by active resolved or unresolved trackers, optical/imaging devices, and/or ephemeris data (along with local position and time).

Once the target is acquired, the acquisition system provides the approximate location of surveillance satellite 12 to the tracking system. The tracking system then tracks the movement of surveillance satellite 12 according to well known principles. For example, active or passive imaging devices can be used to track acquired target surveillance satellite 12.

Target surveillance satellite 12 can be acquired near the horizon and tracked using a closed-loop system at low bandwidth. Once surveillance satellite 12 is being tracked, one or more lasers can be used to effect temporary image denial. For example, when surveillance satellite 12 is above a zenith angle of approximately 70°, a laser source, such as laser 56, can deposit low flux, generally uniform, and coherent light upon at least one imaging sensor thereof, so as to overfill the aperture(s) of the surveillance satellite's sensor(s). Generally, laser 56 will continue to direct laser beam 14 toward surveillance satellite 12 until surveillance satellite 12 has completed its overhead pass.

The tracking system implemented by signal processing and $C^2$ system 58 provides aiming information to beam director 51. The tracking system updates the aiming information for the duration of the time for which image denial is desired.

A fire control system, defined by signal processing and $C^2$ system 58, provides a fire command to laser 56, for example, once the tracking system is successfully tracking target surveillance satellite 12 and for the duration of the time for which image denial is desired. For example, the fire control can activate laser 56 when surveillance satellite 12 is above a zenith angle of approximately 70°. The fire control can be responsive to commands from a ground-based or airborne human crew or can alternatively be responsive to commands from a computer controller that can be ground-based, airborne, or space-based. Such commands can designate targets, designate times of image denial, including provisions for deconflication, and/or designate autonomous operation of the image denial countermeasure system. Deconflication is a process whereby conflicts due to the presence of other satellites are avoided. For example, it may not be desirable to fire laser beam 15 when a nearby friendly satellite is likely to be adversely affected thereby.

An optional battle damage assessment (BDA) system, such as that defined by sensor assembly 53 and signal processing and $C^2$ system 58, provides battle damage assessment for battlefield 17. This assessment may include imagery, electromagnetic intercept, or any other desired type of assessment. For example, an imaging BDA system can be defined by beam director 51, splitter/sensor assembly 52 and signal processing and $C^2$ system 58.

An optional active designation system can illuminate prospective targets on battlefield 17, such as with a laser (which can be a different laser from the laser used to effect surveillance satellite image denial). In this manner, the use of smart bombs and smart missiles on battlefield 17 is better facilitated.

Optionally, closed-loop feedback control may be used to enhance tracking of surveillance satellite 12. Such closed-loop feedback control can be provided by the tracking system. However, according to one embodiment of the present invention, such closed-loop feedback control can be provided or enhanced by sensing laser light that is reflected from one or more sensors of surveillance satellite 12.

Figure 3:
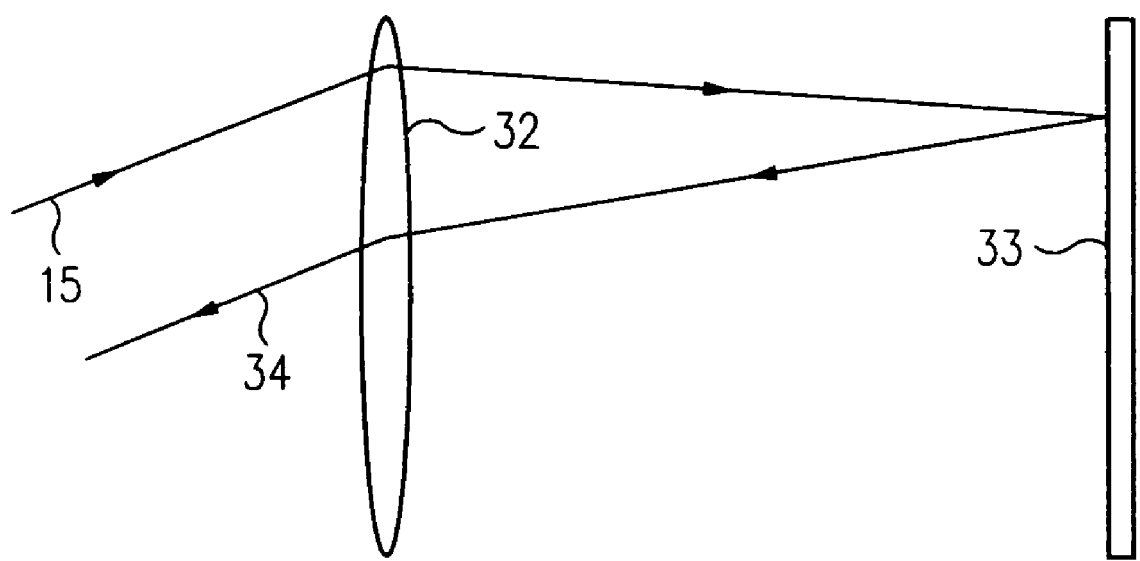
FIG. 3 shows laser light incident upon a sensor of a surveillance satellite so as to deny imaging capability and also shows light reflected from the sensor which can be used to enhance targeting of the surveillance satellite, according to an aspect of the present invention.

FIG. 3 shows how an imaging sensor of a surveillance satellite reflects a portion of the light incident thereon, such that the reflected light can be used to provide closed-loop feedback control of the tracking system. Such reflection occurs much in the same manner that a cat's eye reflects light when a flashlight is shined thereon and is sometimes referred to as retro-reflection.

Laser beam 15 is directed to surveillance satellite 12 to effect image denial. Laser beam 15 is transmitted though lens 32 of an aperture for a sensor of surveillance satellite 12. Laser beam 15 is incident upon focal plane array 33 of the sensor, where it saturates the image sensing devices thereof to effect image denial.

Laser beam 15 is also reflected from focal plane array 33 to define a reflected light 34. At least some of reflected light 34 is transmitted back to UAV 11 (FIG. 1), where it can be used to effect closed-loop feedback control of the surveillance satellite tracking system. Thus, an imaging sensor of a surveillance satellite acts as a beacon or measurement source, which can be used for optical augmentation of the image denial laser beam 15. Such optical augmentation can be used to enhance aiming or tracking of the surveillance satellite 12.

The imaging sensors of surveillance satellites can be designed in a manner that tends to suppress such reflection of light therefrom. However, such suppression is not complete. A bidirectional reflectance distribution function of approximately $10^{-3}$ is not uncommon for light reflected from surveillance satellite sensors. Thus, sufficient light for optical augmentation is provided.

An on-axis (with respect to the optical axis of a surveillance satellite's optical system) laser source and collocated sensor can experience a greatly enhanced return, the optical cross section of which can be as much as six orders of magnitude greater than an off-axis return. Such magnitude is sufficient for very effective use in determining whether or not the laser source 31 is on-axis with respect to the sensor(s) of surveillance satellite 12. Indeed, the return is sufficient to facilitate complex measurements such as measurements regarding changes in both the target system and the atmosphere. Such measurements are impractical with land-based systems, where atmospheric absorption & turbulence effects are too great.

Monitoring of the reflected light 34 facilitates several types of measurement. For example, the delivered intensity of laser beam 15 can be estimated. Further, changes in the optical system of the target surveillance satellite can be observed. Monitoring of the reflected light also facilitates other functionalities, such as air-to-air wavefront correction and lethal infrared countermeasures.

Thus, the intensity of the reflected light 34 can be used for aiming and/or tracking. In this manner, the aiming of laser 56 can be fine tuned, to assure that laser beam 15 is approximately centered upon the optics of surveillance satellite 12, so as to enhance the image denial potential of laser beam 15.

Reflected light 34 can also be used to control maneuvering of UAV 11, such that UAV 11 tends to fly along a path that optimizes the ability of laser 56 to remain on-axis. Thus, if surveillance satellite 12 is attempting to image the northwest portion of battlefield 17, for example, then monitoring the reflected light 34 can cause UAV 11 to move to and/or remain in the northwest portion of battlefield 17, such that on-axis alignment of laser 56 with respect to the imaging sensor(s) of surveillance satellite 12 is maintained. Although the ability of UAV 11 to maneuver in this manner may be limited (such as due to the speeds and distances involved), any such maneuvering will nevertheless enhance the overall effectiveness of the system.

A Greenwood frequency ($f_G$) of less than approximately 100 Hz and an isoplanatic angle ($\theta_0$) of approximately 20 microradians facilitates real time sampling of the intensity of laser beam 34 that is reflected from the imaging sensor(s) of target surveillance satellite 12.

Thus, according to one aspect of the present invention, an optional feedback system enhances the targeting of surveillance satellite 12. The optional feedback system can be comprised of beam director 51, splitter/sensor assembly 52, and signal processing and $C^2$ system 58. Beam director 51 receives reflected light 34 from the imaging sensor of satellite 12. Sensor assembly 53 of splitter/sensor assembly 52 converts the reflected light into electrical signals representative of the position and intensity of reflected light 34. Signal processing and $C^2$ system 58 uses the electrical signals to determine if laser beam 15 is on-axis with respect to the optical imaging system of surveillance satellite 12. The intensity of reflected light 34 will be greatest when laser beam 15 is on-axis with respect to the optics of surveillance satellite 12.

The tracking system can control aiming of laser 56 and/or maneuvering of UAV 11. For example, tracking system can control aiming of laser 56 and/or maneuvering of UAV 11 so as to tend to maximize the intensity of reflected light 34 and thereby tend to maintain laser beam 15 on-axis with respect to the optics of surveillance satellite 12. Thus, the use of such optical feedback tends to enhance the ability of the present invention, according to at lease one aspect thereof, to precisely track surveillance satellite 12.

More particularly, as incident laser beam 15 becomes more off-axis, then the intensity of reflected light 34 is reduced substantially in power. Conversely, as incident laser beam 15 becomes more on-axis, then the intensity of reflected light 34 is increased substantially in power. The feedback system cooperates with tracking system so as to tend to maintain incident laser beam 15 on-axis with respect to the aperture of surveillance satellite 12.

As discussed above, feedback information may be used to modify the angle of incidence of the coherent radiation beam with respect to the surveillance satellite's imaging system, at least to some degree, by repositioning UAV 11. That is, if the UAV 11 is positioned at some portion of battlefield 17 that is not presently being imaged by the surveillance satellite, then the UAV 11 may be moved to that portion of battlefield 17 that is being imaged, such that the countermeasure laser beam 15 will be more on-axis with respect to the optical system of the surveillance satellites imaging sensor.

UAV 11 can alternatively remain in generally the same position and wait until surveillance satellite 12 re-orients its optical system so as to image that portion of the battlefield where UAV 11 is located. Such action would be appropriate when it is particularly desirable to deny imaging of that specific portion of battlefield 17 where UAV 12 is located.

Although laser light is discussed herein as the type of coherent radiation that is used to overfill the aperture of an imaging device of a surveillance satellite, those skilled in the art will appreciate that other types of coherent radiation may be used to reversibly deny or permanently deny imaging capability to a surveillance satellite. For example, x-ray radiation, microwave radiation, and/or other types of electromagnetic radiation may be used to effect image denial. Thus, the discussion herein of laser light as the type of coherent radiation used to deny imaging capability is by way of example only, and not by way of limitation.

One or more aspects of the present invention provide the capability to reversibly deny electro-optical sensors, such as space-based electro-optical sensors, the ability to provide images. Such image denial may be performed at times and locations that provide a tactical advantage. Tactical advantage may be provided by affording force protection and/or information overmatch at critical, potentially decisive, times during a conflict. Such image denial capability can prevent and/or delay an enemy's space-based reconnaissance efforts without inflicting physical harm on the space-based assets. In this manner, a military option is provided that is more likely to be politically acceptable than an alternative that results in physical harm to the enemy's space-base assets.

One or more aspects of the present invention facilitate the construction of an electro-optical countermeasures system using smaller, less costly laser sources. Indeed, the laser source of the present invention can be approximately one twentieth of the size of that of a ground-based countermeasure system having similar capabilities. Such reduction of size is advantageously accompanied by a corresponding reduction in cost for the airborne laser system and increased transportability and supportability. One or more aspects of the present invention further provide a portable electro-optical countermeasures system, to assure that satellite surveillance countermeasures can be implemented at the locations of battlefields worldwide. Additionally, at least one aspect of the present invention provides an airborne platform that is capable of wandering (moving) and that is also capable of looking down (to facilitate BDA and/or active target designation, for example).

Embodiments described above illustrate but do not limit the invention. It should also be understood that numerous modifications and variations are possible in accordance with the principles of the present invention. Accordingly, the scope of the invention is defined only by the following claims.

I claim:

1. A countermeasure system for an imaging system of a surveillance satellite having an imaging sensor array, the countermeasure system comprising:
   an airborne platform;
   a radiation source coupled to the airborne platform; and,
   a closed-loop feedback control system operable to:
      direct an energy beam from the radiation source onto the sensor array of the satellite;
      monitor the intensity of radiation reflected back from the sensor array of the satellite; and,
      using the intensity of the reflected radiation, control the intensity of the radiation directed onto the sensor array so as to temporarily blind the sensor array without damaging it.

2. The countermeasure system of claim 1, wherein the airborne platform is capable of ascending to an altitude greater than approximately 15,000 feet.

3. The countermeasure system of claim 1, wherein the airborne platform comprises a vehicle selected from the group consisting of an unmanned aerial vehicle (UAV), an aircraft, and a balloon.

4. The countermeasure system of claim 1, wherein the radiation source comprises a coherent radiation source.

5. The countermeasure system of claim 1, wherein the radiation source comprises a source of substantially coherent light.

6. The countermeasure system of claim 5, wherein the coherent radiation source comprises a laser.

7. The countermeasure system of claim 1, wherein the closed-loop feedback control system further comprises an acquisition system and a tracking system, the acquisition system being operable, using the intensity of the reflected radiation, to acquire the satellite proximate a local horizon, and the tracking system being operable, using the intensity of the reflected radiation, to track the satellite after acquiring it.

8. The countermeasure system of claim 7, wherein the acquisition system includes a fire control system operable to activate the radiation source when the satellite is above a zenith angle of approximately 70°.

9. The countermeasure system of claim 1, wherein the closed-loop feedback control system is further operable, using the intensity of the reflected radiation, to control maneuvering of the airborne platform so as to control an angle between an optical axis of the radiation source and an optical axis of the satellite sensor array.

10. The countermeasure system of claim 1, further comprising a battle damage assessment system onboard the airborne platform.

11. The countermeasure system of claim 1, further comprising an active designation system onboard the airborne platform.

12. A countermeasure system for an imaging system of a surveillance satellite, the countermeasure system comprising:
   an airborne platform capable of operating at an altitude greater than about 15,000 feet;
   a radiation source coupled to the airborne platform; and,
   an optical augmentation system using radiation reflected from an imaging sensor array of the satellite to aid in targeting the satellite, the augmentation system comprising a closed-loop feedback control system operable to direct an energy beam from the radiation source onto the sensor array of the satellite, to monitor the intensity of radiation reflected back from the sensor array, and, using the intensity of the reflected radiation, to center the energy beam on the sensor array, to track movement of the sensor array, and to control the intensity of the radiation directed onto the sensor array such that the sensor array is temporarily blinded but is not damaged.

13. A method of disrupting operation of an imaging system of a surveillance satellite, the method comprising:

positioning a radiation source at an altitude greater than about 15,000 feet;

directing radiation from the radiation source onto an imaging sensor array of the imaging system of the satellite;

monitoring the intensity of radiation reflected back from the sensor array of the satellite; and, using the intensity of the reflected radiation, controlling the intensity of the radiation directed onto the sensor array such that the intensity of the directed radiation is sufficient to temporarily blind the sensor array but not sufficient to damage it.

* * * * *